Aug. 3, 1926.

M. G. SHERMAN

LOCK NUT

Filed June 30, 1923

1,595,026

Inventor
Melvin G. Sherman

By Lancaster and Allwine
Attorneys

Patented Aug. 3, 1926.

1,595,026

UNITED STATES PATENT OFFICE.

MELVIN G. SHERMAN, OF MARSHFIELD, OREGON.

LOCK NUT.

Application filed June 30, 1923. Serial No. 648,812.

My present invention relates to improvements in lock bolts and nuts.

The primary objects of the invention is the provision of lock nuts for use in connection with bolts of special formation, whereby the nuts may be securely locked in any determined position upon the bolts when the nuts are slightly moved in a direction counter to that for tightening, without liability of rupture of any of the parts of nuts or bolts, and preventing accidental detachment of the nuts from the bolts.

A further object of the invention is the provision of lock nuts which are extremely simple in formation, necessitating a minimum of parts, very durably constructed, and providing inexpensive devices, which may be used repeatedly as no distortion of any part is required to form the locking action.

Other objects and advantages of my invention will appear in the following detailed description, taken in connection with the accompanying drawing, forming a part of this specification, and in which drawing:—

Figure 1:
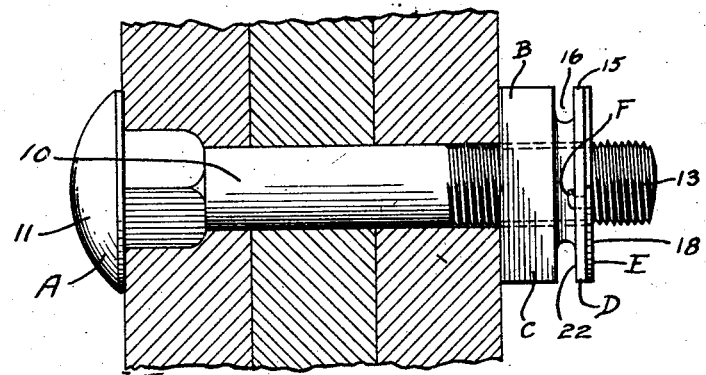
Figure 1 is a view partly in plan and partly in horizontal section showing a nut lock constructed according to my invention in use.
Figure 2:
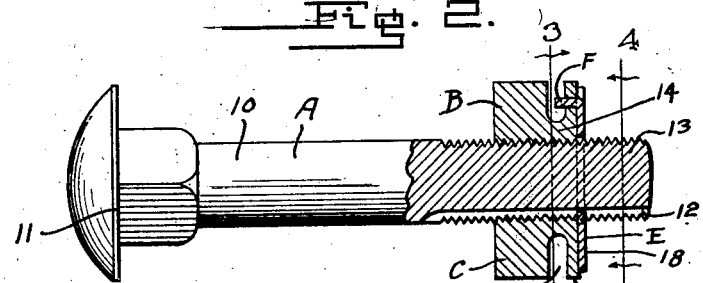
Figure 2 is a view partly in plan and partly in horizontal section showing a nut lock constructed according to my invention.
Figure 3:
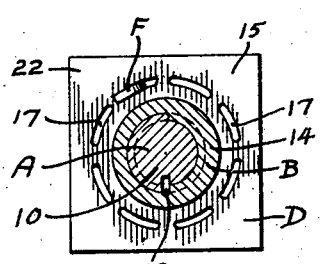
Figure 3 is a cross sectional view taken on the line 3—3 of Figure 2, and looking in the direction of the arrows.
Figure 4:
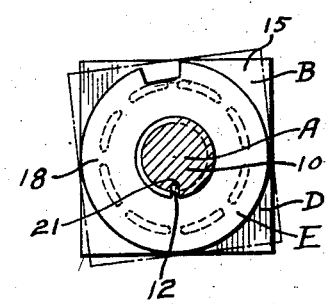
Figure 4 is a cross sectional view, taken on the line 4—4 of Figure 2 and showing the manner in which the locking action is accomplished.
Figure 5:
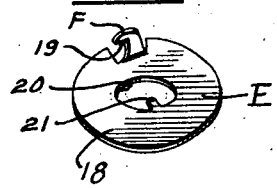
Figure 5 is a perspective view of the locking device.

In the drawings, where similar characters refer to similar parts throughout the views, A designates a bolt of the improved type; B, an improved lock nut mounted thereon, said lock nut B including a main body portion C and a flange D; and E a locking device including a locking hook F for locking engagement with the nut B.

The bolt A may of course, be manufactured to suit the particular purpose for which the same is required and includes a shank 10 having a head 11 integral therewith as in ordinary bolt construction. The bolt A, however, is of special construction, in that a longitudinal groove 12 is provided in the shank 10 at the screw threaded portion 13 thereof, said groove being of sufficient depth to be disposed immediately below the roof of the screw threads. It is preferred that the groove 12 extend to the end of the bolt A.

The nut B is preferably formed with a main body portion C which may be square in cross section, and provided with a neck 14 and a flange 15 carried thereby on its outer end forming the recess 16. A plurality of elongated transverse eyes or apertures 17 are provided in flange 15 in circumferentially spaced apart relation for the reception of the locking hook F. These eyes or apertures 17 are arcuated and are preferably of a length and width to just permit of the passing of the locking hook therethrough. If it is desired the recess 16 may be omitted and eyes of L-shaped formation provided in the face of the nut for receiving the locking hook F. The bore of the nut is screw threaded throughout its entire length.

The locking device E may be either cast, or stamped from a flat sheet of metal, being preferably round and of less liameter than the cross dimension of the particular nut for which it is made. At the outer edge of the washer 18 and at right angles thereto a locking element or hook F is struck; the bill 19 of the hook confronting the inner face of the washer. Extending inwardly of the bore 20, a lug or tongue 21 is provided for holding the washer against rotation when the lug or tongue is positioned in the groove 12 of the bolt A. The locking element F is arcuated slightly, in order to conform to the arcuation of the eyes or apertures 17 so that the same may be easily inserted, and permit of the slight rotation of the nut for locking engagement. In the example shown, the bill 19 of the locking element F is adapted to engage the inner face 22 of the flange D when the nut B' is turned in a direction counter to that for tightening for forming the locking action.

The operation of the improved lock nut B is effected in the same manner as the standard type of nut, and may be accomplished by use of the ordinary spanner wrench, or the ordinary type of adjustable monkey wrench. When the desired clamping action has been secured against any work it is desired to clamp intermediate the head 11 and nut B, the locking device is placed on the bolt A, the locking element F confronting the nut B, and the lug 21 is slid to project thru the groove 12. It can now be seen that by slightly moving the nut in a direction counter to that for tightening, that the bill 19 will be brought into surface contact with the inner face 22 of the flange D thereby preventing the locking device E from moving longitudinally of the shank 10, and by reason of the co-acting relation between the locking element F, the eyes or apertures 17, the lug 21, and the groove 12, the nut will be held against rotation counter to that for tightening.

Various changes in the shape, size and arrangement of parts may be made to the form of my invention herein shown and described, without departing from the spirit of the invention or the scope of the claims.

I claim:—

1. In combination, a bolt, a nut threaded upon said bolt provided with a flange on the outer end thereof and spaced apart from the main body portion, said flange provided with circumferentially spaced apart apertures, and locking means held against circumferential movement on said bolt and including a hook element extending into anyone of said apertures for holding the nut against rotation and having a shank portion extending through the aperture and a head portion carried by the shank and having engagement with the inner face of the flange to prevent movement of the locking means out of locking engagement with the nut.

2. In combination, a bolt, a nut threaded upon said bolt provided with a plurality of circumferentially spaced apart eyes open to the end face of the nut, and a locking device including a body held against circumferential movement on said bolt, and a rigid hook extending from the said body toward the nut, said eyes of the nut relatively larger than said rigid hook of the locking device, to permit the bill of the hook to be passed thru any one of said eyes.

MELVIN G. SHERMAN.